United States Patent [19]
Allsup et al.

[11] Patent Number: 6,115,214
[45] Date of Patent: Sep. 5, 2000

[54] ROTARY SNUBBER ASSEMBLY FOR A DISC DRIVE

[75] Inventors: David Scott Allsup, Oklahoma City; Kenneth Lee Pottebaum, Yukon; Phillip Randall Ridenour, Mustang, all of Okla.

[73] Assignee: Seagate Technology, Inc., Scotts Valley, Calif.

[21] Appl. No.: 09/001,301

[22] Filed: Dec. 31, 1997

Related U.S. Application Data

[60] Provisional application No. 60/055,813, Aug. 15, 1997.

[51] Int. Cl.$^7$ ........................................... G11B 5/54
[52] U.S. Cl. ................................................. 360/105
[58] Field of Search ................... 360/104, 105, 360/106, 107, 97.01, 97.02, 97.03

[56] References Cited

U.S. PATENT DOCUMENTS

| | | | |
|---|---|---|---|
| 3,713,121 | 1/1973 | Fasano et al. | 360/105 |
| 4,703,376 | 10/1987 | Edwards et al. | 360/105 |
| 4,839,756 | 6/1989 | Chew et al. | 360/105 |
| 4,843,503 | 6/1989 | Hazebrouck et al. | 360/106 |
| 5,231,556 | 7/1993 | Blanks | 360/105 |
| 5,341,260 | 8/1994 | Jabbari | 360/105 |
| 5,404,636 | 4/1995 | Stefansky et al. | 29/603.03 |
| 5,422,770 | 6/1995 | Alt | 360/105 |
| 5,453,891 | 9/1995 | Takemoto | 360/105 |
| 5,508,857 | 4/1996 | Horita | 360/105 |
| 5,543,986 | 8/1996 | Albrecht | 360/105 |
| 5,550,695 | 8/1996 | Matsumoto | 360/105 |
| 5,581,424 | 12/1996 | Dunfield et al. | 360/105 |
| 5,644,451 | 7/1997 | Chan et al. | 360/105 |
| 5,764,437 | 6/1998 | Meyer et al. | 360/105 |
| 5,801,899 | 9/1998 | Genheimer | 360/97.01 |

FOREIGN PATENT DOCUMENTS

| | | |
|---|---|---|
| 404079085A | 3/1992 | Japan . |
| 02315883 | 7/1992 | Japan . |
| 8-106743 | 4/1996 | Japan . |
| 2 178 585 | 2/1987 | United Kingdom . |

*Primary Examiner*—David Davis
*Attorney, Agent, or Firm*—Crowe & Dunlevy

[57] ABSTRACT

A snubber assembly for a disc drive having a plurality of rotatable discs and an actuator assembly supporting read/write heads for flying support above the data surfaces of the discs, the snubber assembly being positioned outboard to the outer perimeters of the discs in a disc clearing position when the disc drive is in the operational mode. The snubber assembly has a plurality of snubber members that nest the discs to limit the deflection of the discs when the snubber assembly is moved to a disc nesting position. A latch member secures the actuator assembly when the snubber assembly is moved to the disc nesting position. In the preferred embodiment, ramp members extend from the snubber members to lift the heads from the data surfaces when the snubber assembly is moved to the disc nesting position.

18 Claims, 3 Drawing Sheets

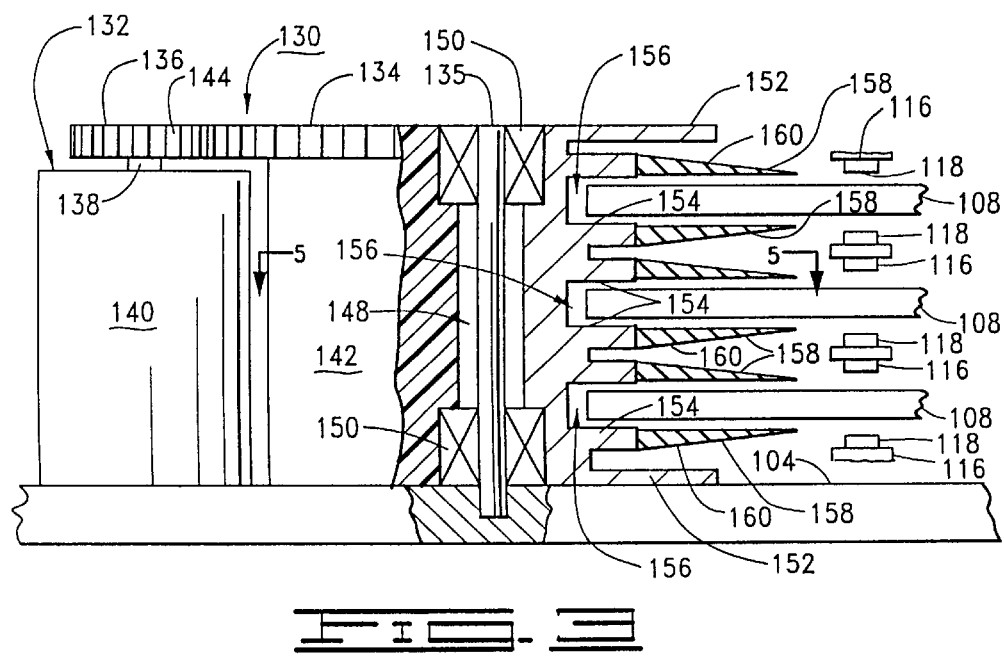
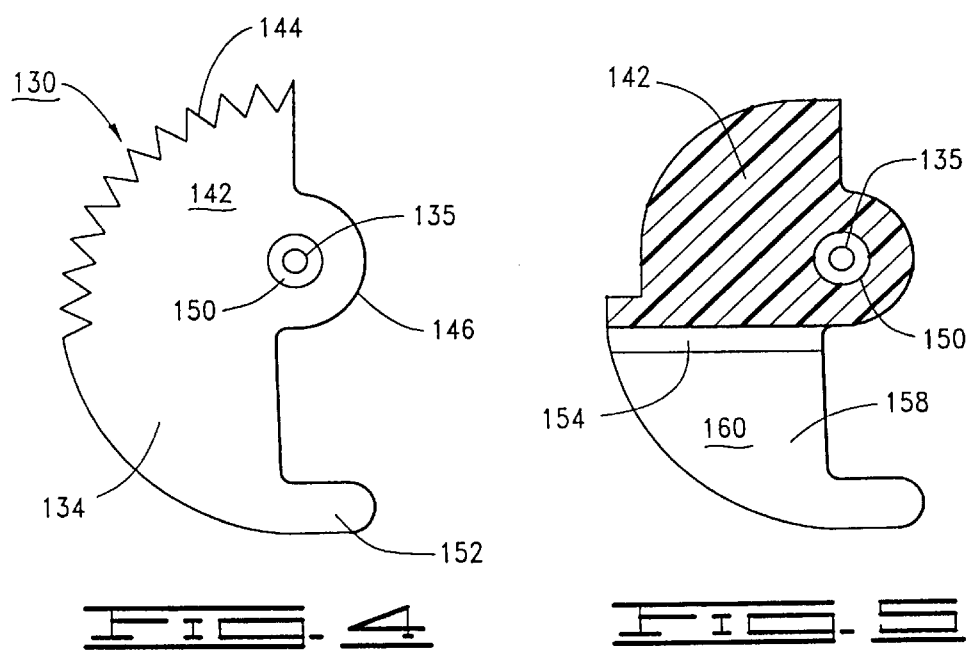

ROTARY SNUBBER ASSEMBLY FOR A DISC DRIVE

RELATED APPLICATION

This application claims the benefit of U.S. Provisional Application Ser. No. 60/055,813 filed Aug. 15, 1997 and is related to U.S. patent application Ser. No. 09/001,302 entitled RAMP LOAD ASSEMBLY FOR A DISC DRIVE, filed concurrently herewith and assigned to the assignee of the present application.

FIELD OF THE INVENTION

This invention relates generally to the field of disc drive storage devices and more particularly, but not by way of limitation, to a rotary snubber assembly for a hard disc drive assembly.

BACKGROUND OF THE INVENTION

Hard disc drives enable users of computer systems to store and retrieve vast amounts of data in a fast and efficient manner. In a typical disc drive, data are magnetically stored on one or more discs which are rotated at a constant high speed and accessed by a rotary actuator assembly having a plurality of read/write heads that fly adjacent the surfaces of the discs.

The heads are suspended from gimbal assemblies extending from arms of the rotary actuator assembly and have aerodynamic features that enable the heads to fly upon an air bearing established by air currents set in motion by the rotation of the discs. Ramp load apparatuses allow a disc drive to spin down when the drive is powered down while preventing the read/write heads from coming into contact with the disc surfaces, while snubber apparatuses serve to protect the discs from deleterious effects that can be caused by the application of mechanical shocks to the disc drive while in its non-operational mode.

Ramp load apparatuses have been utilized that incorporate a stationary set of wedges positioned over the outer edges of the disc surfaces. When a typical drive incorporating this type of ramp load is powered off, a control torque is applied to the actuator arm assembly which rotates the heads toward the outer perimeters of the discs, forcing the gimbal assemblies up onto the ramps of the ramp load apparatus, thereby causing the heads to be lifted away from the disc surfaces. One of the main disadvantages of this ramp load apparatus is that the stationary ramps overlap the outer perimeters of the discs, rendering the disc surface areas below the ramps inaccessible and therefore useless, and thus significantly reducing the amount of disc surface available for data storage.

Another problem with stationary ramp load apparatuses is that the ramps lift up only one side of the gimbal assemblies during the initial stage of engagement. This causes a roll to be induced to the heads, which are still flying in close proximity to the discs. The effect of this induced roll is that one side of the heads is flying closer to the discs than normal, greatly increasing the chance of head to disc interference, which can cause drive failure. Furthermore, stationary ramp load apparatuses rely on the actuator motor to push the heads up onto the ramps. A result of this design is that a force perpendicular to the centerline of the gimbal assembly is applied to the suspension every time a head is loaded onto one of the ramps. This force translates into a rotational moment about the swage joint of the gimbal assembly. The swage joint is a feature that attaches the gimbal assembly to the actuator arm. A rotational moment applied to the swage joint can cause the swage joint to slip during ramp loading, resulting in mis-registration of the heads relative to servo tracks, which can cause either a loss in drive performance or drive failure.

The slope of a stationary ramp affects the amount of disturbance that is induced to the fly height and attitude of a head during loading onto, and unloading from, the ramp. The steeper the slope, the more roll is induced during ramp loading and unloading. The steeper the ramp slope, the faster the head will unload off the ramp and onto the disc, generally causing overshoot and a lower fly height during the transition period as the head settles at its steady state fly height. Conversely, as the slope of a stationary ramp is reduced to minimize these effects, more surface area near the outer perimeter of the discs is lost for data storage.

Of major concern is the potential damage to a disc drive that can occur from a mechanical shock applied to the disc drive. Such a shock can cause the discs and head assemblies to flex, causing physical contact between the discs and the head assemblies. Due to the flexibility of the gimbal assemblies which support the heads, the heads can obtain significant velocities as they accelerate away from and then back into the disc surfaces. Such velocities can be damage both the heads and the disc surfaces.

Furthermore, mechanical shock can impart vibration to the actuator arms, exacerbating the above described flexing and resulting in actuator arm to disc contact. Such actuator arm vibration alone can be of such magnitude as to result in the slider portion of the head assemblies to be lifted from the disc surfaces. Not only can these vibrations from shock cause damage to the discs and head assemblies, they can result in deleterious debris generation which can lead to total drive failure.

Stationary disc snubbers have been used to limit the deflection of the discs of a disc drive from resulting from mechanical shock. The function of such a disc snubber is to prevent damaging contact of the discs and the actuator arms/head assemblies. Since the discs are rotating at high rotational speeds during the operation of the disc drive, disc contact during operation of the disc drive with a stationary snubber can cause major disc damage and particle generation. Thus, high operational shock requirements can preclude the use of such snubbers.

Not only is there a need to protect the disc drive during the time that the disc drive is powered off, there is a need for disc snubbing to protect non-operating discs from the effects of mechanical shocks without incurring potential contact with the discs during operation.

SUMMARY OF THE INVENTION

The present invention provides an apparatus for preventing damage to the data surfaces of a disc drive by protecting the discs from the deleterious effects of a mechanical shock, while maximizing the usable data surface area on the discs.

The disc drive comprises a plurality of rotatable discs, a plurality of controllably positionable heads, a spindle motor for rotating the associated discs and an actuator assembly supporting read/write heads adjacent the discs. A moveable snubber assembly, setting outside the outer perimeters of the discs, extends snubber members toward the actuator assembly to a disc nesting position during operational shutdown, and the snubber assembly retracts from the disc nesting position to a clearance position outside the disc perimeters during operation of the disc drive, thereby affording full access to the disc storage surfaces and preventing contact between the snubber members and the discs during rotation thereof.

A latch member latches the actuator assembly when the snubber members are moved to the disc nesting position.

These and various other features as well as advantages which characterize the present invention will be apparent from a reading of the following detailed description and a review of the associated drawings.

BRIEF DESCRIPTION OF THE DRAWINGS

FIG. 4 is a top plan view of the snubber apparatus of FIG. 3.

FIG. 5 is a view along 5—5 in FIG. 3.

FIG. 6 is a diagrammatical representation in elevation of the ramp load apparatus of FIG. 3.

DETAILED DESCRIPTION

Figure 1:
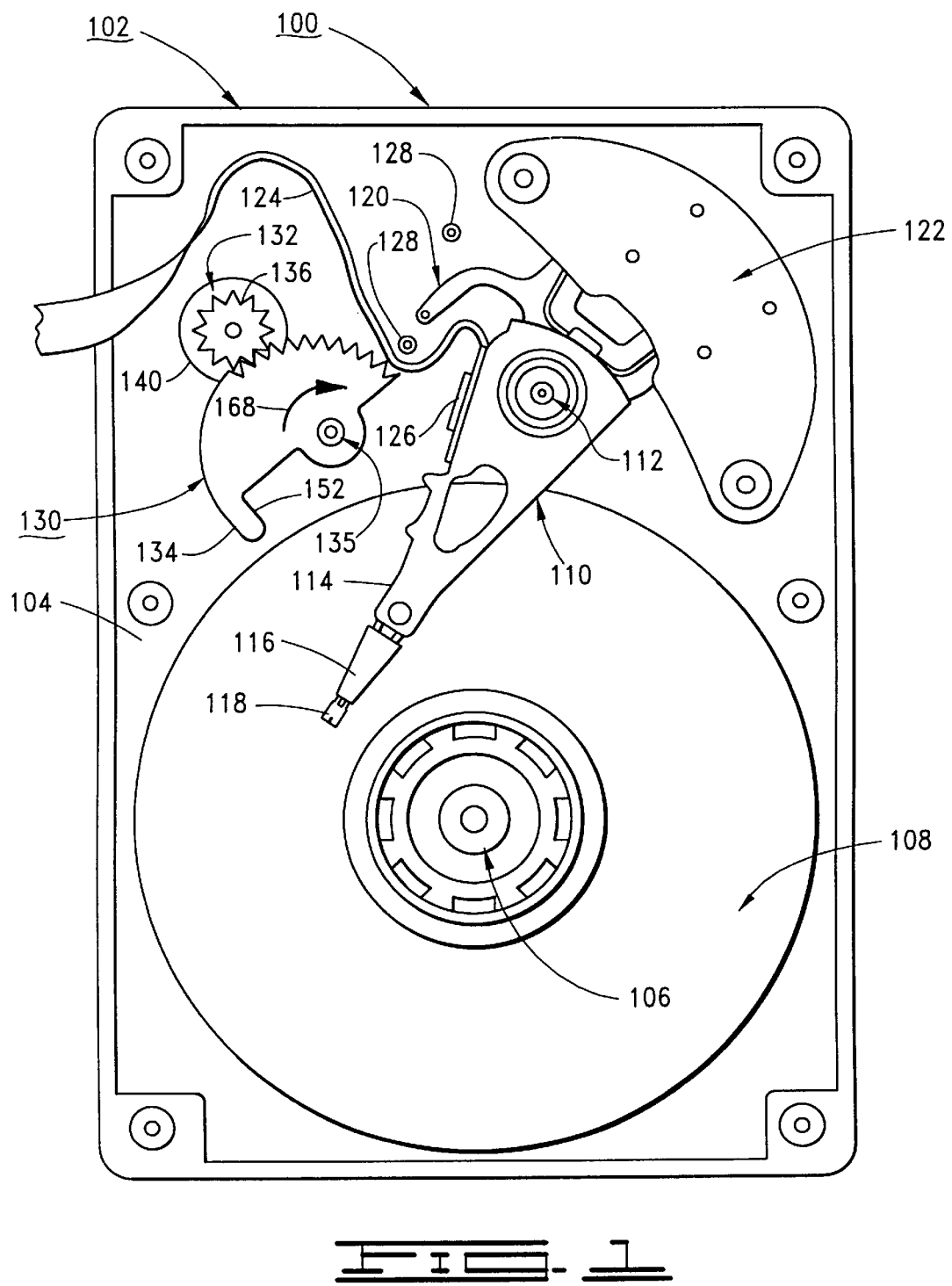
FIG. 1 is a top plan view of a disc drive shown with its top cover removed and having a snubber assembly constructed in accordance with a preferred embodiment of the present invention.

Referring to the drawings in general, and in particular to FIG. 1, shown therein is a top plan view of a bottom portion 100 of a disc drive 102 constructed in accordance with a preferred embodiment of the present invention. The top portion which seals the bottom portion 100 has been removed to display the components of the disc drive 102. The disc drive 102 includes a base deck 104 on which the various components of the disc drive 102 are mounted. The top cover (not shown) cooperates with the base deck 104 to form an internal, sealed environment for the disc drive 102 in a conventional manner.

Mounted to the base deck 104 is a spindle motor 106 to which a plurality of discs 108 are mounted for rotation at a constant high speed when the disc drive 102 is in its operational mode. Adjacent the discs 108 is an actuator assembly 110 which pivots about a pivot shaft bearing assembly 112 in a rotary fashion. The actuator assembly 110 includes a plurality of stacked and spatially separated actuator arms 114 (only the top one of the actuator arms is viewable in FIGS. 1 and 2); connected to the ends of the actuator arms 114 are gimbal assemblies 116, sometimes herein also referred to as support flexures. Data read/write heads 118 are suspended at the ends of the flexures 116 and are supported over the surfaces of the discs 108 by air bearings established by air currents set up by the rotation of the discs 108. As described above, the heads 118 are positionably located over data tracks (not shown) of the discs 108 in order to write and read data to and from the data tracks.

When the disc drive 100 is deactivated, it assumes its non-operational mode in which the rotation of the discs 108 is stopped (that is, the discs are stationary on the spindle motor 106). In transitioning to the non-operational mode, the actuator assembly 110 is rotated toward the outer perimeters of the discs 108. The actuator assembly 110 is provided with a latching assembly 120 to secure the actuator assembly 110 when the disc drive 100 is deactivated, and to limit the travel of the actuator assembly 110.

Continuing with FIG. 1, the actuator assembly 110 is controllably positioned by a voice coil motor (VCM) 122. As is conventional, the VCM 122 includes a pair of permanent magnets (not shown) which create magnetic flux paths disposed above and below an actuator coil (not shown) supported by the bearing assembly 112 opposite the actuator arms 114. Current applied to the actuator coil induces a magnetic field about the actuator coil which interacts with the permanent magnetic flux paths so that the VCM 122 causes relative movement of the actuator coil, thereby imparting controlled rotation of the actuator assembly 110 and thus the actuator arms 114.

To provide the requisite electrical conduction paths between the heads 118 and a disc drive read/write circuitry (not shown), head wires (not shown) are routed on the actuator assembly 110 from the heads 118, along the flexures 116 and the actuator arms 114 to a flex circuit 124. The head wires are secured by way of a suitable soldering process to corresponding pads of a printed circuit board (PCB) 126 of the flex circuit 124. The actuator assembly 110 includes a pair of spaced apart limit stops 128 mounted on the base deck 104. The limit stops 128 interact with the latching assembly 120 and serve as bumpers to limit the travel range of the actuator arm assembly 110.

The present invention provides a moveable snubber assembly 130 which is designed to protect the discs 108 from non-operational mechanical shock. The preferred embodiment depicted by the snubber assembly 130 also is designed to prevent damage to the discs 108 during the operational shutdown of the disc drive 102. That is, the snubber assembly 130 includes a motor assembly 132 and a rotary ramp load apparatus 134. The ramp load apparatus 134 is supported on the base deck 104 to rotate about a support post 135. As will be described more fully below, the snubber assembly 130 is disposed external to the discs 108 in clearing relationship to all components of the disc drive 102 during the operational mode thereof.

Figure 2:
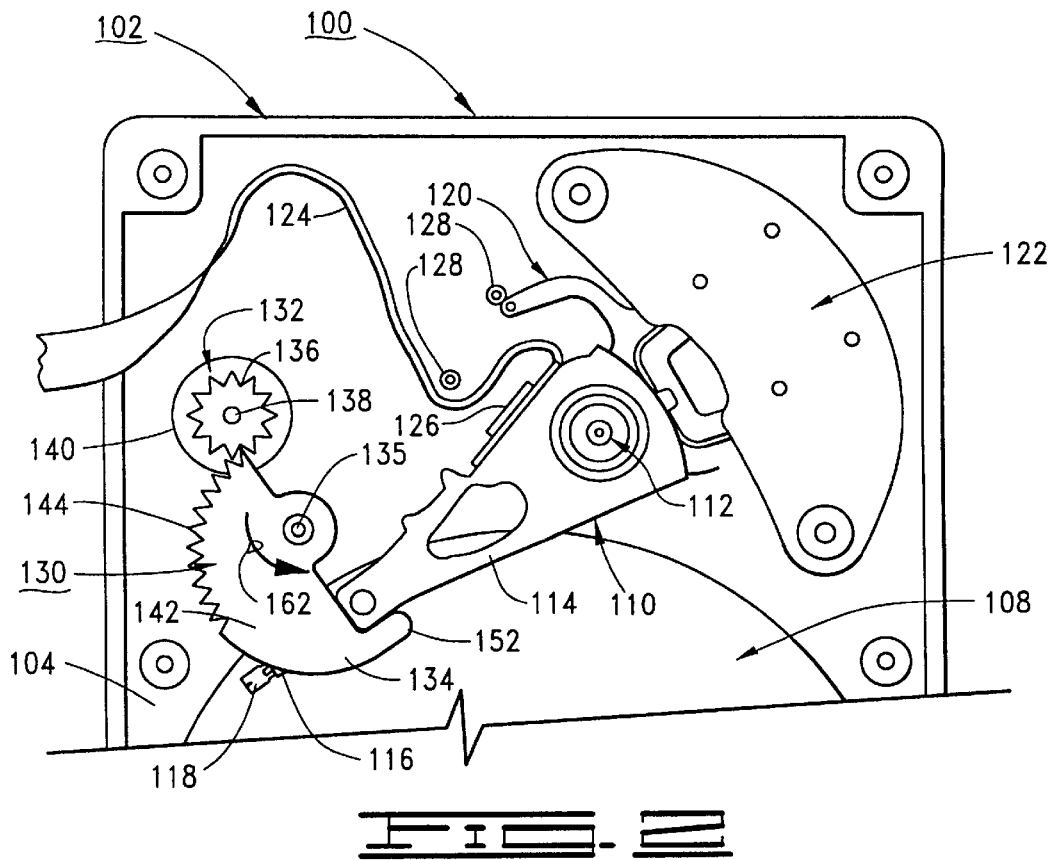
FIG. 2 is an enlarged top plan view of a portion of the disc drive of FIG. 1 with the snubber assembly fully engaged, and with the latch extension of the snubber assembly latching the actuator assembly during shutdown of the disc drive.

With reference now to FIGS. 2 through 5, a description of the snubber assembly 130 will be provided. FIG. 2, an enlarged view of that shown in FIG. 1, depicts the ramp load apparatus 134 rotated about the support post 135 to assume a head park position wherein the ramp load apparatus 134 engages and latches the top actuator arm 114. That is, during shutdown of the disc drive 102, the rotary ramp load apparatus 134 is rotated to extend out over the discs 108. This rotation is achieved by the motor assembly 132 which is operably coupled to a drive gear 136 mounted to a motor shaft 138 of a motor 140.

Figure 3:
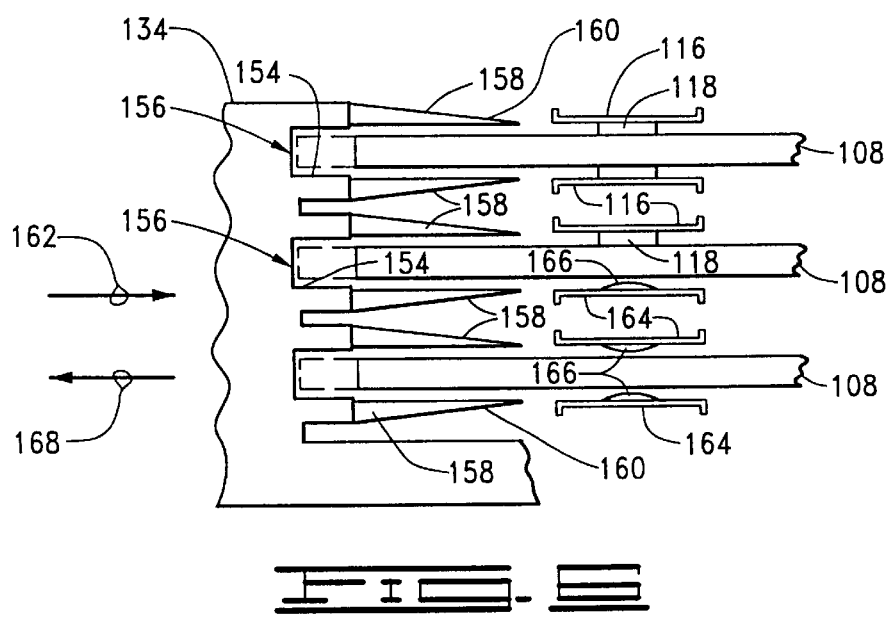
FIG. 3 is a partial cross-sectional view of the snubber assembly of FIG. 1.

FIG. 3 shows the snubber assembly 130 in a partial cutaway, elevational view which shows the support post 135 mounted in an aperture in the base deck 104 via a press fit or other bracketing securement (not shown). The ramp load apparatus 134 has a central body portion 142 which has a generally semi-cylindrical shape except as further described herein, the body portion 142 having an upper rim extension which forms a driven gear 144, the driven gear 144 extending around a portion of the upper rim extension as shown.

As shown in FIGS. 3 and 4, the body portion has a support boss 146 which has a bore 148 therethrough. A pair of bearings 150 are disposed in counterbore portions of the bore 148 and are press fit onto opposite end portions of the support post 135 as shown. The drive gear 136 of the motor assembly 132 is drivingly coupled to the driven gear 144 to selectively dispose the ramp load apparatus 134 in: (1) the retracted position shown in FIG. 1 wherein the ramp load apparatus 134 is in clearing relationship to the discs 108 and the actuator assembly 110; or (2) the head park position shown in FIGS. 2 and 3 wherein the ramp load apparatus 134 is rotated to engage and latch the actuator assembly 110.

The upper rim extension of the ramp load apparatus 134 that forms the driven gear 144 also forms a latch arm 152 which is generally hook shaped and which extends from an opposing side from the driven gear 144 as shown. The latch arm 152 is disposed to engage the side portion of the top one of the plurality of actuator arms 114 when the actuator arms 114 are in the position depicted in FIG. 2. That is, the dimensional thickness of the support flexure 116 connected to the end of the top actuator arm 114 permits passage of the latch arm 152, and the dimensional thickness of the top actuator arm 114 is sufficient for the latch arm 152 to grasp the side thereof for latching engagement and securement thereof. In the latched position of the latch arm 152, the latching assembly 120 of the actuator assembly 110 has been moved to engage one of the limit stops 128.

The motor 140 is of conventional design; that is, the motor 140 has the well known stepper detent characteristics such that the motor 140 assumes a rotational mode determined by the direction of current flow, and once the current flow has ceased, the motor 140 will remain at its last rotated position. The rotational position can be determined by current flow only, but it is common to provide rotational stops so that the motor can rotate only between two positions.

As is known, the spindle motor of a disc drive assembly is used to rotate the discs during the operational mode, and once power is removed, the spindle motor has a back electromotive force (emf) which is harnessed to generate a time limited shutdown current which is useful in downloading the various components of the disc drive which must be secured. It is this shutdown current from the spindle motor 106 which is used to actuate the motor 140, and via the drive gear 136 and driven gear 144, to rotate the ramp load apparatus 134 to the engagement and latching position shown in FIG. 2. Conversely, when the disc drive 102 is powered up, current is directed to the motor 140 via a conventional circuit (not shown) to reverse rotate the motor 140 and the ramp load apparatus 134 whereby the latch arm 152 is caused to be retracted, thereby releasing the top actuator arm 114.

To this point the discussion herein has described the ramp loading feature of the snubber assembly 130, and now with further reference to FIGS. 3 and 5, it will be noted that extending from one side of the central body portion 142 are a plurality of disc snubber members 154. The separation between snubber members 154 form clearance grooves 156 which receive the outer rim portions of the discs 108 when the ramp load apparatus 134 is pivoted toward the discs 108 as shown in FIG. 2. In the preferred embodiment, there is a ramp member 158 which extends from, and is connected to, each of the snubber members 154. However, it will be appreciated that the snubber assembly 130 can be constructed without any of the ramp members 158 in those instances where only the disc snubbing function is required.

Preferably, the ramp members 158 have a ramp surface 160 having a uniform slope, but the ramp surface 160 can be formed with several discreet sloped portions as an equivalent. Importantly, since the ramp load apparatus 134 is completely clear of the discs 108 in the retracted mode (as shown in FIG. 1), the ramp members 158 can be extended as may be desired, permitting the employment of a gradual slope. Preferably, the slope of the ramp surfaces 160 will be about 2 degrees. Since this requires that the ramp members 158 be relatively thin and deep, it may be desirable for the ramp members 158 to be of metal construction, or alternatively, to be strengthened with internally disposed stiffeners. The latter can be accomplished by overmolding or by providing a coating selected from a range of polymeric materials such as Carilon®, a trademark of Shell Oil Company.

FIG. 6, a diagrammatical representation of the rotary snubber assembly 130 including ramp load apparatus 134, is provided for more clearly describing the operation and certain other properties and benefits of the present invention. The ramp load apparatus 134 is depicted in FIG. 6 during shutdown of the disc drive 102. That is, the motor 140, coupled to the ramp members 158 via the ramp load apparatus 134 of the snubber assembly 130, causes the ramp members 158 to be moved in the arrow direction 162 when the disc drive 102 transitions between the operational and non-operational modes. This rotation of the ramp load apparatus 134 places the ramp members 158 in the head park position so that the support flexures 116 can be pushed up onto the ramp surfaces 160 as the actuator arms 114 are moved toward the perimeters of the discs 108 during shutdown of the disc drive 102.

Further movement of the ramp load apparatus 134 in the arrow direction 162 will cause the perimeter portions of the discs 108 to be nested within the clearance grooves 156 (as represented by dash line extensions of the discs 108.) The disc snubber members 154 have a dimensional thickness greater than the ramp members 158 at the point of joinder thereof so that any deflection of the discs 108, such as from a mechanical shock, will cause the discs 108 to contact only the disc snubber members 154.

The cross sectional dimension of the clearance grooves 156 (that is, the spatial dimension between disc snubber members 154) is not critical, but at a minimum, the discs 108 must clear the disc snubber members 154 as the discs 108 nest in the clearance grooves 156. Also, the cross sectional dimension of the clearance grooves 156, at a maximum, should be established in consideration of the amplitude of disc deflection that can be tolerated during the occurrence of mechanical shock.

As the support flexures 116 make contact with the ramp members 158, the contacted edges are tilted upwardly first, and as mentioned above, this initial contact induces a roll to the fly attitude of the heads 118; that is, the heads 118, as lifted along one side edge, will have a roll or twist about their center lines. This roll deflection will be minimized in the present invention due to the gradual slope of the ramp surfaces 160 as compared to previously known stationary ramp load apparatuses. Accordingly, it is believed that, in most instances, the amount of roll deflection induced by the ramp load apparatus of the present invention will not cause head-disc contact. However, there are instances where this induced roll deflection to the flight attitude of the heads cannot be tolerated because the flight distance between the heads 118 and the surfaces of the discs 108 is so small that any differential in deflection between sides of the heads 118 will result in deleterious contact with the discs 108.

Induced roll deflection of the heads 118 can be prevented by the use of modified support flexures such as those shown at 164 in FIG. 6; that is, the lower half of the support flexures depicted in FIG. 6 are of a modified construction. Each of the support flexures 164 is shown with its corresponding head 118 removed for the purpose of displaying a lift button 166 which is disposed along the longitudinal centerline of the support flexure 164. The lift buttons 166 are dimensioned to extend beneath the support flexures 164 to provide a single point of lift as the lift buttons 166 are caused to bear against, and are lifted by, the ramp members 158. This eliminates any roll deflection inducement in the heads 118 supported by the support flexures 164. Thus, the modified support flexures 164, or gimbal assemblies, minimize the roll induced to the heads 118 during the transition time when the support flexures 164 are being lifted and the heads 118 are still flying close to the discs 108.

The lift buttons 166 are generally convex shaped to have a lowest tangential contact, and the lift buttons 166 can simply be stamped or embossed into the under surfaces of the support flexures 164, or the lift buttons 166 can be made separately and connected to the undersides of the support flexures 164 by welding or adhesive bonding. To reduce friction, the lift buttons 166 can be coated with a hard, slick material such as a polyimide.

It will be appreciated that, because the heads 118 are caused to slide along the ramp surfaces 160, it is preferable that the ramp load apparatus 134 be constructed from a material displaying a low coefficient of friction, an example being a polymeric material such as Carilon® or the like. Of course, the purpose is that the ramp surfaces 160 should be sufficiently slick to permit the ramp members 158 to lift the support flexures 116 or 164 with a low amount of sliding friction.

Returning to the disc drive 102, it will be appreciated that, during its non-operational periods, the support flexures 116 (or 164) will be at rest on the ramp members 158, and the outer perimeters of the discs 108 will be nested in the clearance grooves 156 between the disc snubber members 154. When the disc drive 102 is energized to become operational, the discs 108 will again be rotated by the spindle motor 106. As sufficient rotational speed is achieved by the discs 108, the snubber assembly 130 is reverse rotated to move it in the arrow direction 168. This reversal in direction withdraws the latch arm 152 from latching engagement with the top one of the actuator arms 114. Simultaneously, the ramp members 158 are caused to be withdrawn from beneath the support flexures 116 (or 164), and as the support flexures 116 (164) are slidingly lowered along the retracting ramp surfaces 160, the heads 118 are finally lowered to within flying distance above the surfaces of the discs 108, and with complete withdrawal of the ramp members 108, the heads 118 are positioned on the air bearing in their flying attitude.

The reversal of rotation of the snubber assembly 130 in the arrow direction 168 is effected by energizing the motor 140 to reverse rotate the drive gear 136, thereby driving the driven gear 144. Operational power is available during startup of the disc drive 102 for the purpose of driving the motor 140, and in most cases, sufficient power to operate the motor 140 is available during power shutdown from the back emf generation effected by the decaying rotational speed of the spindle motor 106. Should sufficient shutdown power not be available for a particular application of the present invention, it is known to incorporate a spring member to store potential energy during startup to effect rotation of the snubber assembly 130 during power down. Such devices and the required control mechanisms are well known, are considered to be equivalent to powering the motor 140 for reverse rotation, and need not be disclosed herein.

In view of the foregoing discussion, it will be clearly understood that the present invention is directed to an apparatus for parking read/write heads (118) of a disc drive (102) through the use of a controllably positionable snubber assembly (130) adjacent the discs (108) of the disc drive. The snubber assembly, in the preferred embodiment, comprises snubber members (154) which nests the outer perimeters of the discs to limit disc deflection when a mechanical shock is applied to the disc drive during its non-operational mode by rotating to a disc nesting position, and the snubber assembly retracts from the disc nesting position to a disc clearing position when the disc drive is in an operational mode. Further, ramp members (158), coupled to the snubber members, are rotated with the snubber members to the head park position so that the support flexures (116) can be raised from the data surfaces of the discs by the ramp members as the actuator arms (114) are moved toward the perimeters of the discs during power down of the disc drive.

Furthermore, the torque to control the rotation of the snubber assembly can be provided by several equivalent ways. One plausible system would incorporate a torsional spring and a geared shaft. The torsional spring would be designed to provide sufficient torque to engage the ramp load apparatus during the power down cycle, and to provide sufficient latching torque to hold the snubber members and actuator assembly in place during shipping and handling. An electro-magnetic motor could then be used to provide torque via a gear system to counteract the spring and disengage the snubber members. Another approach would be to incorporate wind vanes with the shaft and utilize the windage from the spinning discs to counteract the torsional spring and disengage the snubber members.

It will be recognized that present invention can be practiced in modified forms. For example, since the snubber members are not functionally affected by the ramp members, there may be applications in which the ramp members can be eliminated. That is, a version of the snubber assembly could be constructed without the ramp members for those applications where disc snubbing alone is required. The present invention provides a ramp load apparatus, a snubber apparatus or a combination of both, and a novel latching feature, wherein the apparatus sets outboard to the perimeters of the discs and does not overlap the disc except during periods when the disc drive is non-operational. As for the latching feature, the latch arm of the present invention is independent to the structure of the actuator assembly, which is advantageous in that symmetry of the actuator assembly can be retained. That is, the latch arm of the present invention does not change the dimensional characteristics of the actuator arm, and with the removal of a crash arm extending from one side of the actuator assembly, as is present in prior art disc drives, a source of potential unsymmetrical vibration is prevented.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A snubber assembly for use in a disc drive having a rotatable disc and an actuator assembly arm supporting a head adjacent the disc, the disc being rotated during an operational mode of the disc drive and the disc being stationary during a non-operational mode of the disc drive, the snubber assembly comprising:

a controllably positionable snubber moveable toward the disc and positionable in close proximity to an outer rim portion of the disc to limit deflection of the outer rim portion of the disc during the non-operational mode of the disc drive; and a latch arm supported by the snubber for grasping the actuator assembly arm during the non-operational mode of the disc drive.

2. The snubber assembly of claim 1, further comprising:

a motor which moves the snubber as the disc drive transitions between the operational and non-operational modes.

3. The snubber assembly of claim 1, further comprising:

a ramp member rigidly coupled to the snubber member and which is extendable to position the ramp over the disc in supporting engagement with the actuator assembly for lifting the data head from the disc when the ramp member is in supporting engagement with the actuator assembly, the data head being free to fly over the disc when the ramp member is removed from supporting engagement with the actuator assembly.

4. A disc drive having an operational mode and a non-operational mode, comprising:

a base deck;

a spindle motor supported by the base deck;

a disc supported by, and rotatable by, the spindle motor;

a bearing assembly supported by the base deck;

actuator assembly having an actuator arm, a flexure and a read/write data head supported to fly over the disc when the disc is rotated by the spindle motor, the actuator supported by the bearing assembly and rotatable thereby; and a snubber assembly comprising:

a body portion moveably supported by the base deck;

a latch arm supported by the body portion of the snubber for grasping the actuator assembly arm during the non-operational mode of the disc drive;

a first snubber member supported by and extending from the body portion; and means for moving the body portion in a first direction and in a second direction, the first snubber member being positioned over an outer rim portion of the disc when the body portion is moved in the first direction wherein the first snubber member limits deflection of the outer rim portion of the disc when a mechanical shock is applied to the disc drive during the non-operational mode, the first snubber member positioned beyond an outer perimeter of the disc in a direction away from the outer rim portion when the body portion is moved in the second direction.

5. The disc drive of claim 4 further comprising:

a second snubber member supported by and extending from the body portion, the first and second snubber members positioned over the outer perimeter of the disc when the body portion is moved in the first direction, the disc nested between the snubber members and the snubber members positioned in clearing relationship to the disc when the body portion is moved in the second direction.

6. The disc drive of claim 5 wherein the body portion is rotatably supported by the base deck, and wherein the means for moving the body portion comprises:

rotating means for selectively rotating the body portion in the first direction toward the disc and rotating the body portion in the second direction away from the disc.

7. The disc drive of claim 6 wherein the snubber assembly further comprises:

a ramp member supported by and extending from the body portion; and wherein the ramp member is moved to extend over the disc in supporting engagement with the flexure when the body portion is moved in the first direction, the ramp member being removed from supporting engagement with the flexure assembly when the body portion is moved in the second direction, the data head being lifted from the disc when the ramp member is in supporting engagement with the flexure and the data head being free to fly over the disc when the ramp member is removed from supporting engagement with the flexure.

8. The disc drive of claim 7 wherein the ramp member, when the body portion is moved in the second direction, is disposable in clearing relationship to the disc so that the disc head is positionable without interference from the snubber assembly.

9. The disc drive of claim 8 wherein the ramp member has an inclined surface which is a continuous ramp.

10. The disc drive of claim 9 wherein the inclined surface has a slope of about 2 degrees.

11. The disc drive of claim 10 wherein the ramp member is composed of a material having a low coefficient of friction.

12. In a disc drive assembly having a rotatable disc for containing data and an actuator arm assembly supporting at least one read/write data head, the disc having an operational mode wherein the disc is rotated and a non-operational mode wherein the disc is stationary, the improvement comprising:

a member having at least one pair of disc snubber shelves and a clearance groove therebetween;

a latch arm supported by the member for grasping the actuator arm assembly during the non-operational mode of the disc drive; and means for moving the member having the pair of disc snubber shelves toward the disc so that the disc is nested within the clearance groove, the snubber shelves being in close proximity to the disc to limit deflection of the disc during the non-operational mode of the disc drive.

13. In a disc drive assembly having a plurality of rotatable discs containing data and a movable actuator arm assembly supporting a plurality of data heads, the discs having a rotating mode wherein the discs are rotated and a non-rotating mode wherein the discs are substantially stopped, the improvement comprising:

a plurality of disc snubber members;

a latch arm supported by a first snubber member for grasping the actuator arm assembly during the non-rotating mode of the discs; and means for selectively positioning the disc snubber members in close proximity to the outer perimeters, the discs nesting between the disc snubber members to limit deflection of the discs during a non-operational mode of the disc drive.

14. A ramp load assembly for use in a disc drive having a rotatable disc and an actuator assembly arm supporting a head adjacent the disc, the disc being rotated during an operational mode of the disc drive and the disc being stationary during a non-operational mode of the disc drive, the ramp load assembly comprising:

a controllably positionable ramp member which moves to a head park position over the disc to support the head during the non-operational mode, and which moves away from the head park position to a retracted position beyond an outermost diameter of the disc during the operational mode; and a latch member, rigidly coupled to the ramp member, which grasps the actuator assembly arm when the ramp member is moved to the head park position and releases the actuator arm when the ramp member is moved away from the head park position.

15. The ramp load assembly of claim 14, further comprising:
- a motor operably coupled to the ramp member and which moves the ramp member as the disc drive transitions between the operational and non-operational modes.

16. A disc drive, comprising:
- a basedeck;
- a spindle motor supported by the basedeck;
- a disc supported by, and rotatable by, the spindle motor;
- a bearing assembly supported by the basedeck;
- an actuator assembly having an actuator arm, a flexure and a read/write data head supported to fly over the disc when the disc is rotated by the spindle motor, the actuator assembly supported by the bearing assembly and rotatable thereby; and
- a ramp load assembly comprising:
  - a body portion moveably supported by the basedeck;
  - a ramp member extending from the body portion; and
  - means for moving the body portion in a first direction to position the ramp member to extend over the disc in supporting engagement with the flexure and for moving the body portion in a second direction to a retracted position beyond an outermost diameter of the disc to remove the ramp member from supporting engagement with the flexure, the data head being lifted from the disc when the ramp member is in supporting engagement with the flexure and the data head being free to fly over the disc when the ramp member is removed from supporting engagement with the flexure; and
- wherein the ramp load assembly further comprises:
  - a latch arm supported by the body portion, the latch arm being disposed to grasp the actuator arm when the body portion is moved in the first direction to support the flexure and lift the data head from contact with the disc, the latch arm releasing the actuator arm when the body portion is moved in the second direction.

17. The disc drive of claim 16, wherein the body portion is rotatably supported by the basedeck, and wherein the means for moving the body portion comprises:
- rotating means for selectively rotating the body portion in the first direction toward the disc and rotating the body portion in the second direction away from the disc.

18. A ramp load assembly for use in a disc drive having a plurality of rotatable discs for containing data and an actuator arm assembly supporting a plurality of read/write heads, the discs rotating in an operational mode of the disc drive and the discs stopped in a non-operational mode of the disc drive, the ramp load assembly comprising:
- a plurality of ramp members;
- means supported by the disc drive outboard to the discs for moving the ramp members toward and away from the discs, the ramp members extending adjacent to respective portions of the discs when moved toward the discs to support the actuator arm assembly to lift the read/write heads when the actuator arm assembly is moved toward the outer perimeter of the discs during shutdown of the disc drive, thereby preventing contact of the read/write data heads with the discs in the non-operational mode, and for positioning the ramp members to a retracted position beyond an outermost diameter of the discs when the disc drive is placed in the operational mode; and
- a latch member, rigidly coupled to the ramp member, which grasps the actuator assembly arm when the ramp member is moved to the head park position and releases the actuator arm when the ramp member is moved away from the head park position.

* * * * *